July 13, 1954 J. R. GILMORE ET AL 2,683,778

TELEPHONE LOCKING DEVICE

Filed Oct. 28, 1952

INVENTORS
JAMES R. GILMORE
CLAYTON M. HARMAN
BY

ATTORNEY

Patented July 13, 1954 2,683,778

UNITED STATES PATENT OFFICE 2,683,778

TELEPHONE LOCKING DEVICE

James R. Gilmore and Clayton M. Harman, Philadelphia, Pa.

Application October 28, 1952, Serial No. 317,194

1 Claim. (Cl. 179—189)

This invention relates to a locking device adapted to be applied to a dial telephone to prevent its unauthorized use with or without permitting the receipt of incoming calls.

The nature of the invention will be understood from the following specification and the accompanying drawings in which—

Figure 1:
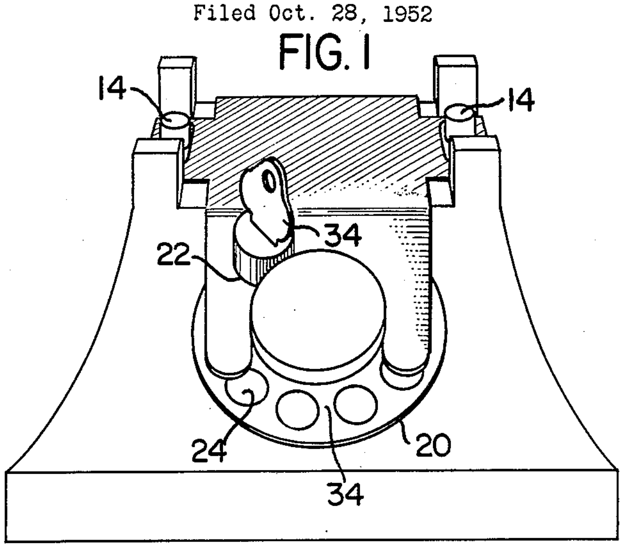
Fig. 1 is a front perspective view of a dial telephone with the transmitter and receiver omitted and with our locking device in position.
Figure 2:
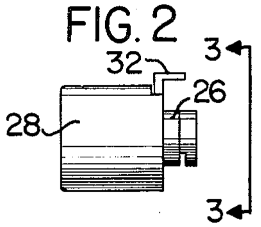
Fig. 2 is a side elevational view of a lock.
Figure 3:
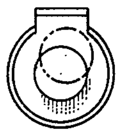
Fig. 3 is an end view looking in the direction of line 3—3 on Fig. 2.
Figure 4:
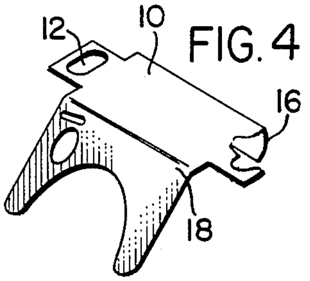
Fig. 4 is a reduced, perspective view of one form of the locking device shown detached.
Figure 6:
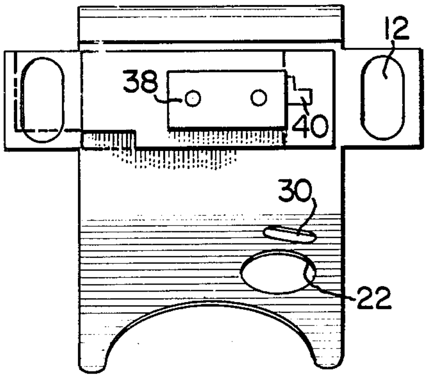
Fig. 6 is a bottom plan view of another form of locking device.

The locking device of Figs. 1 to 5 includes an upper body portion 10 adapted to over-lie the cradle of the telephone receiver and having openings 12 through which the switch pins 14 of the instrument are adapted to project. The body portion 10 also has a rear pendent flange 16 adapted to engage the back wall of the instrument to help position and locate the locking device, and it has a front downwardly slanted dial-covering portion 18 adapted to conceal at least a portion of the dial 20 of the telephone as best shown in Fig. 1. The dial-covering portion 18 has an opening 22 which registers with one of the finger holes 24 of the dial and which is adapted to receive the rotary cam shaped, or offset cylinder 26 of a standard lock 28 which is now in use for this purpose. The dial covering portion 18 also has a slot 30 for receiving a lug 32 on the body of lock 28. The structure of the lock is such that if, when the parts are in the position of Fig. 1, the key 33 is turned in locking direction, the offset cylinder 26 will turn so that the cam or high surface of the cylinder will coact with fixed lug 32 to engage the narrow piece of metal 34 adjacent the finger hole while is engaged by the lock. This fastens the locking plate to the dial and prevents rotation of the dial. However, when the telephone receiver is lifted, the switch pins can be jiggled up and down to alert the operator and, of course, an incoming call may be received.

Figure 5:
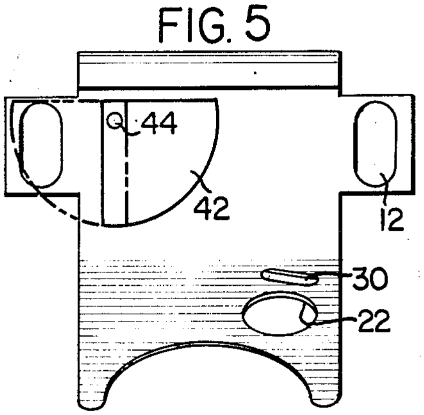
Fig. 5 is a bottom plan view of the locking device shown in Fig. 4.

To make it impossible to use the telephone even to alert the operator or to receive an incoming call, we provide a segment 42 which is pivoted at 44 to the underside of the locking device as best shown in Fig. 5. This segment is movable to a position in which it overlies one of the switch pins so as to depress the latter and thus make it impossible either to jiggle the switch pin or to accept an incoming call.

Instead of the pivoted segment 42 of Fig. 5 we may provide a slide 38 which is secured to the underside of the locking device by one or more rivets or pins which are movable in a slot 40. When it is desired completely to disable the telephone, the slide 38 is moved outwardly so as to overlie and permanently depress one of the switch pins in which regard the slide 38 performs the same function as the segment 42.

In an establishment where there is a large number of minor employees who have to transact business over the telephone, personal calls represent considerable loss in toll charges and in lost time. By the use of the locking device disclosed, the employees referred to can receive incoming but cannot dial any outgoing calls. During the night, or during holidays, the segment 42, or the slide 38, is moved to its outer, switch pin depressing position so as to make it impossible to receive a reverse charge call or to put a call through by jiggling the switch pins or by signallying the operator and asking her to put through a call. Since the switch pins of the telephone instrument operate together, that is, if one pin is depressed, the other pin will be depressed also, we have shown one segment 42 and one slide 38 adapted to act on one of the pins. It is of course within the scope of the invention to provide for covering and depressing both pins if desired.

What we claim is:

A locking device for preventing unauthorized use of a "French" telephone, said device including a body member shaped to form a first portion adapted to be secured to the dial of the telephone to immobilize the same, and a second portion adapted to overlie the cradle of the telephone receiver, said second portion having openings therein through which the switch pins of the telephone may freely project and move and a third portion movably secured to said second portion and movable relative to said second portion to a first position in which it overlies and depresses at least one of said switch pins to prevent any use of the telephone, and to a second position in which it is out of the path of movement of said switch pin and permits partial use of the telephone.

References Cited in the file of this patent

UNITED STATES PATENTS

| Number | Name | Date |
|---|---|---|
| 2,518,554 | Kirby et al. | Aug. 15, 1950 |
| 2,588,176 | Strauch | Mar. 4, 1952 |